Dec. 12, 1933.   V. G. APPLE   1,938,789

ELECTRIC CONTROL MECHANISM

Filed Jan. 27, 1930

INVENTOR.
Vincent G. Apple
BY
Burton & McConkey
ATTORNEYS

Patented Dec. 12, 1933

1,938,789

UNITED STATES PATENT OFFICE 1,938,789

ELECTRIC CONTROL MECHANISM

Vincent G. Apple, Dayton, Ohio, assignor to Bendix Brake Company, South Bend, Ind., a corporation of Illinois Application January 27, 1930. Serial No. 423,643

1 Claim. (Cl. 201—48)

My invention relates to control mechanism for automotive vehicles and has particular reference to a unitary switch member which may be incorporated in an electric circuit for utilization in combination with mechanisms such as is described and claimed in detail in my copending application Serial Number 336,298, filed January 30, 1929, which issued as Patent Number 1,876,540, on September 3, 1932.

An object of my invention is to provide a simply and ruggedly constructed unitary electric circuit control which may be independently operated either to close a circuit in one direction or another through an electric motor assembly such as is described in the above specified copending application. In this application I have disclosed a reversible electric motor which, upon rotation in one direction is operable to crank the motor of the vehicle and upon rotation in the other is operable to apply a system of electric brakes.

Still another object of my invention is to utilize a minimum number of parts, each constructed in simple fashion and of durable, inexpensive material, thereby eliminating to a large extent the necessity of frequent repair, adjustment or replacement of parts.

A further object of my invention is to provide for independent operation of separate and distinct portions of my unitary control element, while at the same time so connecting them in the electric circuit that operation of the control which closes a circuit through the motor in a direction to crank the engine is operable at all time, and that portion which controls the circuit in a reverse direction to apply the brakes may be operated only when the circuit through the starter control member is open.

Still another object of my invention is to include in that portion of my unitary control which functions to close the brake circuit means whereby initial movement thereof results in incorporating a resistance in the circuit, subsequent movement resulting in shunting out the resistance from the circuit and thereby permitting the full electric power from the power source to flow to the brakes.

Still other objects and meritorious features of my invention will become apparent from the following description taken in conjunction with the drawing wherein like numerals refer to like parts throughout the several figures and wherein.

Figure 1:
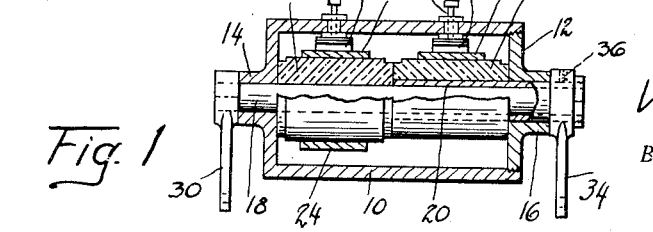
Fig. 1 is an axial sectional elevation of my unitary switch assembly.

In Fig. 1 I have illustrated my unitary switch assembly as composed of a hollow drum shaped casing member 10 which is open at one end. Threaded into this open end of member 10 is the closure member 12. The exterior of the closed end of the drum 10 is provided with a journal 14 and the exterior of closure member 12 is provided with a journal 16. The journal 14 is of somewhat smaller diameter than journal 16 for purposes to be described hereafter.

Rotatably mounted in the journals 14 and 16, and extending axially through the drum 10, is the rod 18. Sleeve member 20 is rotatable about the rod 18, and extends into the journal 16, the journal for this bearing being of somewhat greater diameter to permit insertion of both the rod 18 and the sleeve 20. Secured to the rod 18 at one end thereof, and for rotation therewith, is the insulation rotor 22. This rotor carries the segmental contact bridge members 24 and 26 at its opposite extremities. Secured about the inner periphery of the casing member 10 in operative relation to the rotor 22 are contacts 27, as illustrated in Figs. 2 to 5. Each of these contacts is connected to the exterior of the drum by a terminal 28. The operating lever 30 is connected to the rod 18 for the purpose of rotating the same to bridge the various contacts as illustrated in Figs. 2 to 5.

In similar fashion the single segmental contact bridge member 32 is secured to rotor 31, which is fixed upon the sleeve 20 for rotation therewith about the rod 18. It will be noted that the sleeve may be rotated independently of the rod by means of the operating lever 34 which is secured to the sleeve in any convenient manner, as by the screw 36 threaded in a countersink as illustrated in Fig. 1.

In operative relation to the rotor 31 are contacts 36 and terminals 38 similar to 27 and 28 respectively in every respect except their relative location about the periphery of the drum.

Figure 2:
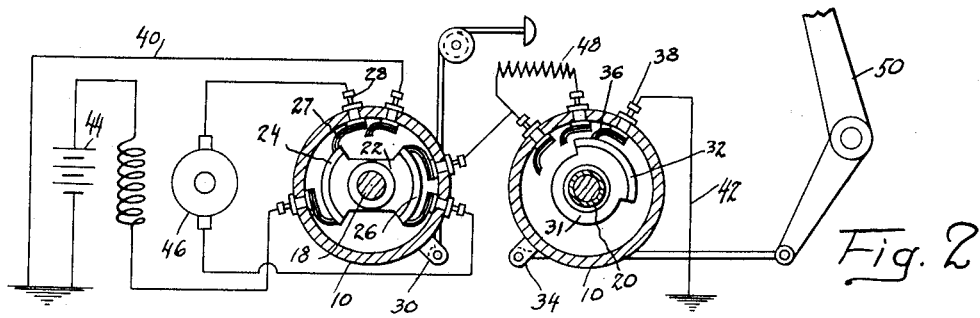
Fig. 2 illustrates the position of the elements when both starter and brake circuits are open.

It will be noted that the terminals for both ground leads 40 and 42 project beyond the current carrying segments, or contact bridging segments, in this way presenting incomplete circuits which result in inaction which is the case when the starter and brakes are off. This position of the various elements under such circumstances is illustrated in Fig. 2.

Figure 3:
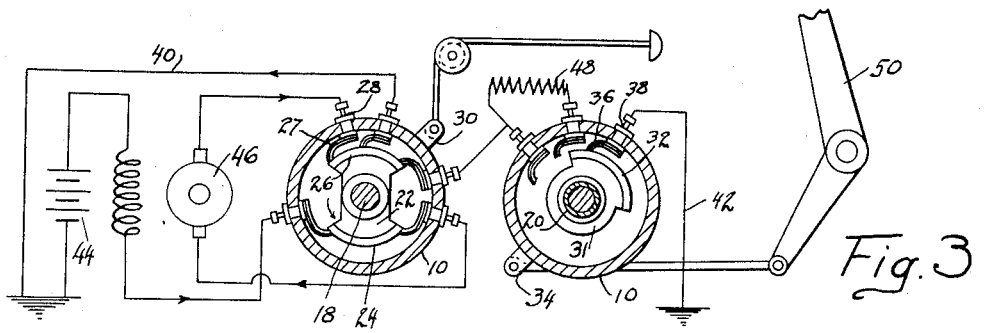
Fig. 3 illustrates the position of the elements when the starter is on and the brakes are off.

In Fig. 3 where the starter is on and the brakes are off, current flows from the battery 44 to one of the terminals as indicated by the arrow in Fig. 3, thence across the segment 24 to an opposite terminal, thence around as indicated by the arrow through the reversible electric motor 46 to the left hand upper terminal, thence across a portion of the segment 26 and out, as indicated by the arrow, to its ground connection. The starting circuit is thus completed. It is to be noted that the current, when the switch elements are in this position, is also free to flow on through the brake switch terminals, but inasmuch as the rotor 31 of the switch bridging segment is in the "brakes off" position, this circuit is not grounded and cannot be completed. For this reason should the operator decide to apply the brakes while the starting switch is on, proper rotation of the starting motor to crank the engine still takes place by virtue of the position of the rotor 22 which determines the direction of current flow.

Figure 4:
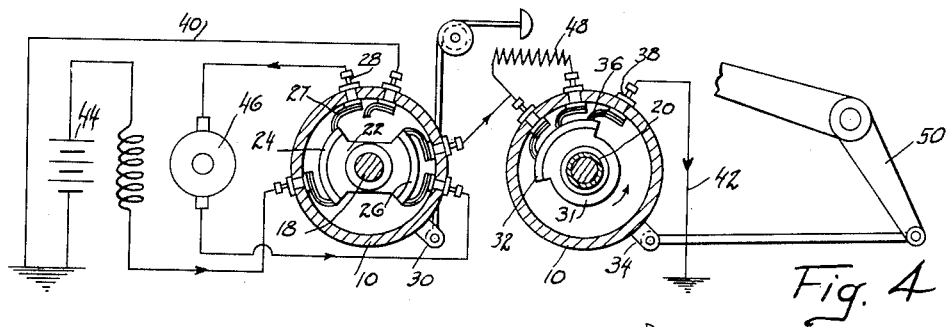
Fig. 4 illustrates the position of the elements when the starter is off and the brakes are on, and Fig. 5 illustrates the position of the elements when both starter and brake circuits are closed.

Fig. 4 illustrates the position of the elements when the starter switch is off and a brake switch rotor 31 has been rotated to apply the brakes. In this instance the current flows from the battery to one of the contacts of the starter switch, as indicated by the arrow, thence across the segment 24, out the upper terminal of the contact bridged by the said segment 24 and through the motor 46 in the direction indicated by the arrow, back to the starter switch across the segment 26 and thence through the resistance coil 48 to the segment 32, across said segment and to its ground connection as indicated by the arrow.

By providing this resistance unit 48 I have precluded the full strength of the current being applied to operate the brakes instantaneously upon actuation of the brake pedal 50. It will be noted that the contacts 36 and their respective terminals 38 are so positioned that upon rotation of the segment 32 from its inoperative position, as disclosed in Fig. 2, to its "full on" position, as disclosed in Fig. 4, the two contacts on the right at the top of this brake switch will be bridged upon initial rotation of rotor 31. Thus the resistance 48 is included in the brake circuit at first, but upon subsequent movement of the segment 32 in the direction of the arrow the extreme left hand contact will be bridged and in this way a resistance 48 shunted out of the circuit.

Figure 5:
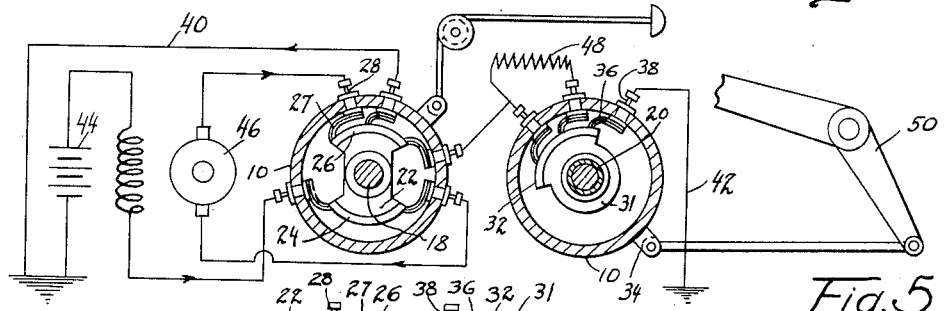

In Fig. 5 I have illustrated the position of the elements and the resultant circuit when both the starter switch and the brake switch portions of my unitary control are in their operative position, starter on and brakes on. Inasmuch as the position of the segments 24 and 26 of the starter switch determine the direction of the circuit through the electric motor 46, the current will always flow in the same direction when the starter switch is on. This direction is indicated clearly by the arrows in both Figs. 3 and 5, and it will be noted that in both instances the circuit through motor 46 flows in the same direction, regardless of the position of the brake switch.

The illustration of Fig. 5 discloses a situation which will often arise during operation of the vehicle when utilizing my control, and it will be noted that under such circumstances, it is necessary that the brakes be retained in their applied position manually while the engine is being cranked by starting motor 46.

I contemplate the filling of my cylindrical drum casing member 10 with oil for the purpose of effectively preventing any arcing which may occur during rotation of segments. Although I have not specified any particular position in which my unit switch control should be mounted, I contemplate securing it directly to the electric starting motor.

Various modifications of my mechanism may be apparent to those skilled in the art and for that reason I intend to limit myself only within the scope of the appended claim.

A unitary switch comprising a hollow cylindrical casing provided with bearings at each end, a shaft rotatably journalled in said bearings and extending therebeyond, a sleeve rotatably mounted on one end of said shaft and extending within said casing throughout a portion of its length, means positioned at opposite ends of said casing secured to said shaft and said sleeve respectively for actuating the same independently of one another, contact bridging units secured in juxtaposition to one another by said shaft and said sleeve respectively, a plurality of circumferentially arranged contacts extending through said casing in operative relation to each of said bridging members, two of the contacts associated with one of said bridging members including therebetween a resistance coil, and a connection between one of the contacts associated with the other bridging member and one of the contacts to which the resistance coil is connected.

VINCENT G. APPLE.